United States Patent [19]

Blaszyk et al.

[11] 4,385,802
[45] May 31, 1983

[54] LONG WAVELENGTH, LOW-LOSS OPTICAL WAVEGUIDE

[75] Inventors: Paul E. Blaszyk, Big Flats; Robert Olshansky, Addison, both of N.Y.

[73] Assignee: Corning Glass Works, Corning, N.Y.

[21] Appl. No.: 157,518

[22] Filed: Jun. 9, 1980

[51] Int. Cl.³ ............................................. G02B 5/172
[52] U.S. Cl. ............................. 350/96.33; 350/96.34
[58] Field of Search .............. 350/96.30, 96.33, 96.34; 65/3.12

[56] References Cited

U.S. PATENT DOCUMENTS

| | | | |
|---|---|---|---|
| 4,114,980 | 9/1978 | Asam et al. | 350/96.34 |
| 4,243,298 | 1/1981 | Kao et al. | 350/96.33 |

FOREIGN PATENT DOCUMENTS 54-160826  12/1979  Japan.

OTHER PUBLICATIONS

Kawachi et al., *Electronics Letters*, vol. 13, No. 15, Jul. 21, 1977, pp. 442-443, "Low-Loss Single-Mode Fibre at the Material-Dispersion . . . ".
Sentsui et al., *Fifth European Conference on Optical Communication*, Amsterdam, Sep. 1979, "Low Loss Monomode Fibers with $P_2O_5$-$SiO_2$ . . . ".
Okada et al., *Electronics Letters*, vol. 14, No. 4, Feb. 16, 1978, pp. 89-90, "Improved Chemical Vapour Deposition Method . . . ".
*Electronics Letters*, 15(14), Jul. 1979, Ainslie et al., "Preparation of Long Lengths of Ultra-Low-Loss Single Mode Fibre", pp. 411-413.
*Electronics Letters*, 15(4), Feb. 1979, Miya et al., "Ultimate Low Loss Single-Mode Fibre at 1.55 $\mu$m," pp. 106-108.
*Electronics Letters*, 15(10), May 1979, Edahiro et al., "Spectral Loss Characteristics . . . ," pp. 274-275.
*Electronics Letters*, 15(22), Oct. 1979, Edahiro et al., "Phosphor-Doped Silica Cladding V.A.D. Fibres," pp. 726-728.

*Primary Examiner*—John D. Lee
*Assistant Examiner*—Frank Gonzalez
*Attorney, Agent, or Firm*—W. J. Simmons, Jr.

[57] ABSTRACT

An optical fiber waveguide of the type comprising an outer cladding layer, an axially disposed core of $SiO_2$ doped with $GeO_2$ and a first inner cladding layer of $SiO_2$ doped with an oxide such as $P_2O_5$ for lowering the preform processing temperature. A second inner cladding layer of pure $SiO_2$ is disposed between the first inner cladding layer and the core to prevent $P_2O_5$ from diffusing into the core, thereby eliminating absorption losses from the P—O—H band in the 1.1–1.8 $\mu$m region.

6 Claims, 4 Drawing Figures

LONG WAVELENGTH, LOW-LOSS OPTICAL WAVEGUIDE

BACKGROUND OF THE INVENTION

1. Field of the Invention

This invention relates to an optical waveguide for use at long wavelengths and more particularly, to single mode low-loss optical waveguides which are especially suitable for the propagation of light, the wavelength of which is in the range between 1.1 and 1.8 μm.

Since the time that optical fiber waveguides were first considered for use in optical communication systems, attempts have been made to develop fibers having lower loss and higher information capacity. It has been known that scattering loss decreases with wavelength and that the scattering loss component can be less than 1 dB/km at wavelengths greater than 1 μm. There is current interest therefore in the development of fibers for use in the range between 1.1 and 1.8 μm. Some materials such as $P_2O_5$ and $B_2O_3$, which are suitable for use at shorter wavelengths, have been given less consideration for use in the infrared region because of the infrared absorption loss characteristic of such materials. However, oxides such as $GeO_2$, $Sb_2O_3$ exhibit suitably low loss in the infrared region when employed as a dopant for silica.

There is current interest in the use of single-mode fibers for use in the infrared region since, in addition to the possibility of achieving low loss, such fibers enable very high capacity telecommunication systems to be designed with fewer repeater stations. Single-mode fibers having losses less than 1 dB/km have been reported. These fibers, which contain cores of silica doped with germania, were prepared by a chemical vapor deposition technique.

The optical characteristics of a single mode fiber are determined mainly by the parameter V which is expressed by the formula $$V = (2\pi a/\lambda) \sqrt{n_1^2 - n_2^2}$$

where a is the core radius, λ is the wavelength of the propagated light and $n_1$ and $n_2$ are the refractive indices of the core and cladding, respectively. In the range of the value of V no larger than about 2.4, single mode propagation will occur for step index fibers.

2. Description of the Prior Art

Single mode waveguides having losses less than 1 dB/km in the infrared region have been made by a chemical vapor deposition process whereby reactant vapors flowing through a glass tube react to form particles which are deposited on the inner surface of the tube where they are consolidated to form a glassy layer. One or more layers of glass are formed on the inner surface of the tube in this manner. Ordinarily, the coated bait tube has at least two compositional regions. The interior region, which ultimately forms the core of the resultant optical fiber, consists of $SiO_2$ and $GeO_2$. The exterior region, which forms the cladding, consists essentially of $SiO_2$. The remaining critical step involves pulling the relatively large diameter cylindrical preform into a relatively small diameter fiber. Prior to pulling the preform into a fiber, the preform is usually collapsed into a smaller diameter preform or preferably into a solid cylindrical mass.

Fabrication of this type of fiber is difficult for several reasons. The higher deposition temperature required to deposit pure $SiO_2$ leads to tube shrinkage during deposition and necessitates the use of pressure control of tube diameter. Deposition rates are reduced because of the difficulty of sintering the particles of $SiO_2$ that are deposited to form the cladding. The tube collapse step is very difficult because of the high viscosity of the deposited glass. The high temperature required to collapse the coated bait tube leads to a larger index dip at the fiber axis and causes a greater diffusion of hydroxyl ions from the substrate tube toward the core material. Also, because of these processing difficulties, only relatively small preforms have been formed by this technique.

Dopants have been added to the deposited cladding layer to lower the deposition and sintering temperature of the process. The addition of a small amount of $P_2O_5$ to the deposited silica cladding layer is taught in the publication: S. Sentsui et al., "Low Loss Monomode Fibers with $P_2O_5$—$SiO_2$ Cladding in the Wavelength Region 1.2-1.6 μm", Fifth European Conference on Optical Communication, Amsterdam, September, 1979. The use of $P_2O_5$ along with either $B_2O_3$ or F in the deposited silica cladding layer is taught in the publication: B. J. Ainslie et al., "Preparation of Long Length of Ultra-Low-Loss Single-Mode Fiber" Electronics Letters, July 5, 1979, Vol. 15, No. 14, pp. 411-413. The use of such dopants has resulted in a deposition temperature of about 1500° C., which is approximately 200° C. lower than the temperature required to deposit the pure silica cladding layer. The reduced deposition temperature resulting from a $P_2O_5$ level of 0.3 to 1.0 wt.% increases the deposition rate, greatly reduces tube shrinkage and distortion, and makes the collapse process much easier.

During the manufacture of single-mode waveguides by the aforementioned chemical vapor deposition process residual water may be introduced into the light region of the fiber by several mechanisms. By residual water in glass is meant that the glass contains a high level of OH, $H_2$ and $H_2O$. Water can be introduced by employing a bait tube containing a large amount of water, by employing reactants which contain water, or it can enter through leaks in the vapor transport system.

The main disadvantage of using $P_2O_5$ in the cladding is that OH radicals trapped at phosphorus cites result in a broad P—O—H absorption band which increases attenuation in the 1.3-1.8 μm range. A discussion of P—O—H absorption in the infrared region of the spectrum appears in the publication: T. Edahiro et al. "Spectral Loss Characteristics of $GeO_2$—$P_2O_5$ Doped Silica Graded-Index Fibres in Long-Wavelength Band", Electronics Letters, May 10, 1979, Vol. 15, No. 10, pp. 274-275.

SUMMARY OF THE INVENTION

It is therefore an object of the present invention to provide a low-loss infrared optical fiber waveguide which is easily fabricated and which is essentially free from absorption losses caused by OH radicals.

The optical fiber waveguide of the present invention is particularly useful in the infrared region of the electromagnetic spectrum. This waveguide is of the type which comprises a first glass cladding layer and a second glass cladding layer disposed on the inner wall surface of the first layer, the softening temperature of the second layer being less than that of the first layer. This type of waveguide also comprises an axially disposed core of $SiO_2$ doped with an oxide to increase the refractive index thereof, the dopant being such that the core glass exhibits relatively low attenuation losses at wavelengths between about 1.1 and 1.8 μm. The improvement of the present invention comprises a layer of pure $SiO_2$ disposed between the second glass cladding layer and the core. The refractive index of the $SiO_2$ layer is equal to or less than that of the second cladding layer.

DETAILED DESCRIPTION OF THE INVENTION

It is to be noted that the drawings are illustrative and symbolic of the present invention and there is no intention to indicate scale or relative proportions of the elements shown therein.

Figure 1:
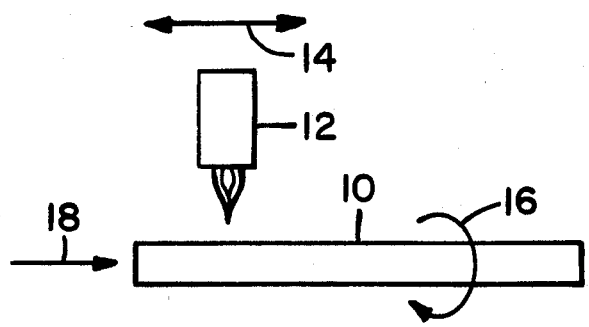
FIG. 1 is a schematic illustration of an apparatus employed in the formation of the optical fiber waveguide of the present invention.

Referring to FIG. 1, there is a schematic illustration of an apparatus for depositing layers of cladding and core material on the inner surface of a glass bait tube 10. Heating means 12 is caused to move relative to tube 10 as indicated by arrow 14. Tube 10 rotates about its axis as indicated by arrow 16. Reactants flow into and through tube 10 as indicated by arrow 18. Each traverse of heating means 12 in the direction of arrow 18 causes a layer of uniform composition to be deposited. A predetermined number of passes of the heating means along the tube is required to form the cladding and core portions of the preform.

The bait tube is generally formed of pure $SiO_2$ or $SiO_2$ doped with one or more oxides including $B_2O_3$. The water content of the bait tube is not a critical factor due to the structure of the resultant fiber. The reactants necessary to form the oxide layers in bait tube 10 include oxygen and compounds containing the elements necessary to form the desired oxides. The oxides $SiO_2$, $B_2O_3$, $P_2O_5$ and $GeO_2$ can be deposited by employing the reactants $SiCl_4$, $BCl_3$, $POCl_3$ and $GeCl_4$, respectively. This list of reactants is intended to be exemplary, it being well known that other reactants can be employed to form the listed oxides. Fluorine is added to the deposited glass by supplying fluorine-containing gas such as $CCl_2F_2$ to the bait tube.

Numerous reactant delivery systems known in the prior art are suitable for delivering reactants 18 to tube 10. Reference is made in this regard to the teachings of U.S. Pat. Nos. 3,826,560, 4,148,621 and 4,173,305 and copending patent application Ser. No. 872,619, "Reactants Delivery System for Optical Waveguide Manufacturing" filed Jan. 26, 1978 by M. Aslami.

Figure 2:
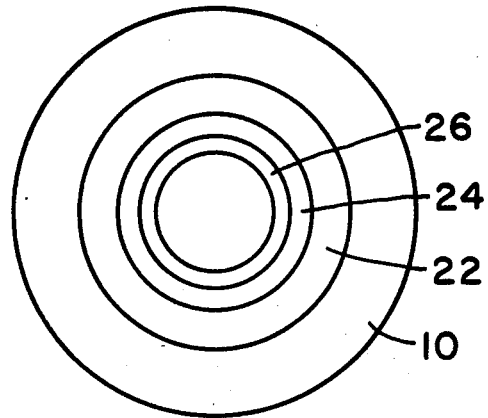
FIG. 2 is a cross-sectional view of a preform formed in accordance with the present invention.
Figure 3:
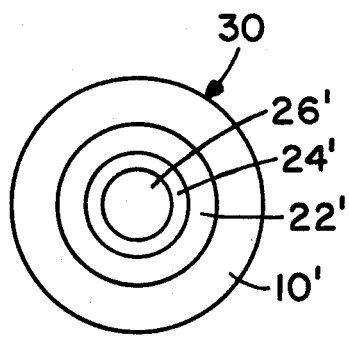
FIG. 3 is a cross-sectional view of an optical fiber waveguide formed from the preform of FIG. 2.

FIG. 2 shows the various layers which are deposited within bait tube 10 in accordance with the present invention. FIG. 3 illustrates the resultant fiber 30 which is formed by collapsing and drawing the preform of FIG. 2. The various regions of the fiber illustrated in FIG. 3 are represented by primed reference numerals which correspond to the layers of the preform of FIG. 2 that are referenced by the same numerals. Prior to the deposition of glass layers on the inner surface of tube 10, the burner may be caused to traverse and fire polish that tube. A layer 22 of soft cladding glass is initially deposited on the inner surface of bait tube 10. Layer 22 consists of $SiO_2$ doped with an oxide such as $P_2O_5$ or $B_2O_3$ which lowers the processing temperature. If an oxide such as $P_2O_5$ is employed, it may be desirable to employ an additional dopant such as $B_2O_3$ or F for the purpose of decreasing the refractive index of that layer. As stated above, the addition of $P_2O_5$ to layer 22 has the deleterious effect of increasing the attenuation in the 1.3-1.8 μm region when the core layer is deposited directly on layer 22.

In accordance with the present invention a layer 24 of pure $SiO_2$ is introduced between layer 22 and layer 26 of core material. The thickness of layer 24 must be sufficient to provide in the resultant fiber 30 a silica layer 24' having a minimum thickness of about 1.5 times the core radius. This minimum thickness should be great enough to insure that about 99% of the light propagating in fiber 30 propagates in the central region which comprises core 26' and silica layer 24'. The thickness of layer 24' should not be so great that the processing difficulties encountered in the fabrication of the aforementioned pure silica clad fibers are introduced. After layer 22 of soft cladding glass is deposited, it is sufficient to deposit layer 24 of silica during a few longitudinal passes of burner 12 along tube 10. By adding this thin layer of silica, some tube shrinkage occurs, and collapse is made slightly more difficult. However, overall processing is far easier in the practice of the present method than that of the method of producing fibers wherein the entire deposited cladding layer comprises pure silica.

The introduction of the pure silica inner cladding layer prevents the diffusion of $P_2O_5$ from the outer cladding layer 22 into the core layer 26. Thus, absorption losses in the P—O—H band in the 1.3-1.8 μm region are greatly reduced.

In order to draw the preform of FIG. 2 into the fiber of FIG. 3 the preform should be collapsed into a solid rod. The collapse step is preferably performed under pressure as taught in U.S. Pat. No. 4,154,591. Moreover, prior to the drawing step, the collapsed preform may be inserted into a glass tube which thereafter becomes the outer cladding layer of the resultant fiber. This latter mentioned practice is sometimes employed to form single mode waveguides wherein the ratio of the core diameter to the fiber diameter is relatively small. Notwithstanding the current interest in single mode fiber waveguides as evidenced by various publications cited hereinabove, this invention also encompasses multimode fiber waveguides.

EXAMPLE 1

The following is a typical example of the formation of an optical waveguide filament in accordance with the present invention. A low water content silica substrate tube having an outside diameter of 25 millimeters and a wall thickness of about 2.5 millimeters was mounted in a deposition lathe well known in the art. The burner was caused to traverse the tube six times to fire polish the same at a temperature of about 2000° C. The constituent reactants $SiCl_4$, $GeCl_4$, and $POCl_3$ were delivered to the substrate tube by a chemical vapor deposition system of the type taught in the above mentioned U.S. Pat. No. 3,826,560. Oxygen was bubbled through the liquid reactants to entrain vapors of the reactants. Illustrative parameters of the process of this example are set out in Table I.

TABLE I

| Layer | No. Burner Passes | T (°C.) | Reactant Flow Rates in g/min | | |
|---|---|---|---|---|---|
| | | | SiCl₄ | GeCl₄ | POCl₄ |
| Clad 22 | 23 | 2050 | 1.0 | 0 | 0.02 |
| Clad 24 | 2 | 2300 | 1.0 | 0 | 0 |
| Core 26 | 1 | 2300 | 0.27 | 0.20 | 0 |

For the example of Table I the oxygen provided for reaction was about 2500 sccm. The burner traverse rate of layer application was about 13.3 cm/min.

The resultant preform was then collapsed under pressure in accordance with the teachings of U.S. Pat. No. 4,154,591. During collapse, the preform temperature was increased from 2300° C. to 2500° C. for six burner passes, while the preform was rotated at a speed of 50 rpm. The resultant solid preform was then mounted in a drawing apparatus well known in the art, the end thereof heated to a temperature of about 2000° C. and drawn into an optical fiber waveguide having the cross-sectional profile illustrated in FIG. 3. The parameters of the resultant fiber are set out in Table II.

TABLE II

| Layer | Composition (wt. %) | Diameter (μm) | Refractive Index (at 0.9 μm) |
|---|---|---|---|
| Core 26' | 9 GeO₂—91 SiO₂ | 6.75 | 1.4590 |
| Clad 24' | 100 SiO₂ | 15 | 1.4518 |
| Clad 22' | 1 P₂O₅—99 SiO₂ | 36 | 1.4522 |
| Clad 10' | 100 SiO₂ | 125 | 1.4518 |

Figure 4:
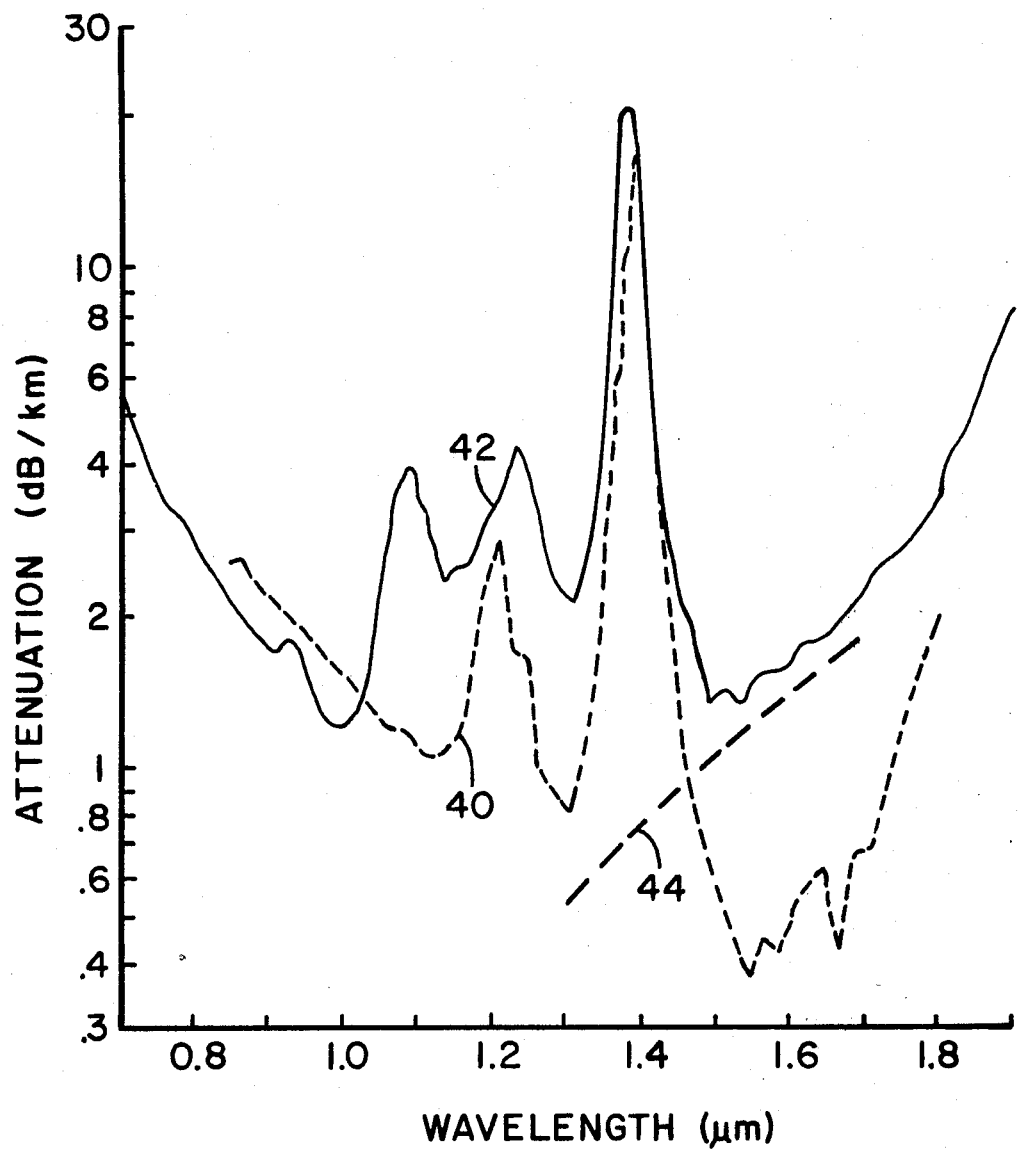
FIG. 4 is a spectral attenuation graph illustrating the improvement in attenuation obtained by the present invention.

Curve 40 of FIG. 4 shows the spectral attenuation of the fiber of Example 1 between 0.8 and 1.8 μm. Except for the peak at 1.4 μm, the attenuation is about 2 dB/km or less between 0.9 and 1.75 μm, a minimum attenuation of less than 0.4 dB/km occurring at 1.55 μm.

EXAMPLE 2

To illustrate the improvement of the present invention the process parameters set forth above were employed in the fabrication of a second fiber except that the silica inner cladding layer 24 was omitted, and clad layer 22 was formed by 25 burner passes. Only five burner passes were needed to collapse the preform. The core diameter of the resultant fiber was about 6.78 μm. Curve 42 of FIG. 4 shows the spectral attenuation of the fiber of Example 2. Dashed line segment 44 illustrates the existence of a broad P—O—H absorption band. This has caused the attenuation at wavelengths between 1.5 μm and 1.8 μm to increase by about 1.0 dB/km and the attenuation at 1.3 μm to increase by about 1.3 dB/km.

We claim:

1. A single-mode optical fiber waveguide for use in the infrared region of the electromagnetic spectrum, said waveguide being of the type comprising
   a first glass cladding layer,
   a second glass cladding layer disposed on the inner wall surface of said first layer, the softening temperature of said second layer being less than that of said first layer,
   an axially disposed core of SiO₂ doped with GeO₂ to increase the refractive index thereof, the resultant core glass exhibiting relatively low attenuation losses at wavelengths between 1.1 and 1.8 μm, the improvement comprising a third layer of pure SiO₂ disposed between said second glass cladding layer and said core, the refractive index of said SiO₂ layer being equal to or less than that of said second cladding layer, the minimum thickness of said third layer being about 1.5 times the radius of said core.

2. A waveguide in accordance with claim 1 wherein the radius a of said core and the concentration of GeO₂ in said core are such that the quantity $$(2\pi a/\lambda)\sqrt{n_1^2 - n_2^2}$$

is less than 2.4 at wavelengths greater than 1.1 μm.

3. A waveguide in accordance with claim 2 wherein said second cladding layer comprises SiO₂ doped with P₂O₅, B₂O₃ or combinations thereof.

4. A waveguide in accordance with claim 2 wherein said second glass cladding layer comprises SiO₂ doped with P₂O₅ and additional dopants selected from the group consisting of B₂O₃ and F.

5. A waveguide in accordance with claim 1 wherein said second cladding layer comprises SiO₂ doped with P₂O₅, B₂O₃ or combinations thereof.

6. A waveguide in accordance with claim 1 wherein said second glass cladding layer comprises SiO₂ doped with P₂O₅ and additional dopants selected from the group consisting of B₂O₃ and F.

* * * * *